Patented Aug. 22, 1944

2,356,303

UNITED STATES PATENT OFFICE 2,356,303

CATALYTIC PROCESS FOR THE TREATMENT OF HYDROCARBON OILS

Gerald C. Connolly, Baton Rouge, La., assignor to Standard Oil Development Company, a corporation of Delaware No Drawing. Application October 4, 1938, Serial No. 233,159

1 Claim. (Cl. 196—52)

This invention relates to a catalytic process for the treatment of hydrocarbon oils and pertains more particularly to the use of a catalyst consisting principally of the oxides of silicon and aluminum and adapted for the conversion of hydrocarbon oils such as, for example, catalytic cracking and polymerization of such oils.

It has heretofore been known that motor fuel of improved anti-knock properties can be produced from higher boiling hydrocarbons, such as, for example, gas oil, by passing such oil in vapor form while at cracking temperature in contact with hydro-silicates of alumina such as naturally active or activated clays.

During the conversion treatment, the clay material becomes fouled more or less gradually by carbonaceous deposits which accumulate on the surface of the contact mass. In view of this, it is necessary to periodically discontinue the conversion operation and regenerate the catalyst to remove such carbonaceous deposits. This regeneration of the catalyst can be accomplished by introducing into the catalyst mass an oxidizing gas such as air, or air diluted with an inert gas at temperatures sufficient to burn such carbonaceous deposits. To avoid deterioration or loss of activity of the catalyst, it is necessary to carefully regulate the temperature during regeneration. It has been found, for example, that if the temperature during regeneration exceeds 1100° F. for any substantial period of time, the activity of the clay is virtually destroyed.

One of the principal objects of the present invention is to use a catalyst for the conversion of hydrocarbon oils which has a higher level of efficiency than active or activated clays or other adsorbent contact materials of the type heretofore used.

A further object of my invention is to use a catalyst which not only has a higher level of efficiency than catalysts heretofore employed, but to also use a catalyst which is less sensitive to high temperature and which will retain its activity even though subjected to higher temperatures during regeneration.

A further object of my invention is to use a catalyst which has a materially longer life than catalysts of the type heretofore employed.

Other objects and advantages of my invention will be apparent from the more detailed description hereinafter.

I have found that synthetic catalysts consisting of silica and alumina prepared by combining the alumina with the silica while the silica is in hydrous or hydrated form are more effective than those produced by combining the alumina with relatively dry silica such as silica gel.

The term hydrous silica, as here employed, is intended to mean silica containing a substantial amount of free water not chemically combined with the silica or in solid solution therewith. The free water is readily distinguishable from the chemically combined water or water in solid solution by being readily distilled or vaporized or may be frozen at a temperature not materially below the freezing point of water. The term, as here employed, is therefore not intended to be an antonym for anhydrous.

The hydrous silica, may, for example, be in the form of a solution (hydrosol), an undried or partially dried hydrogel, or gelatinous precipitate or heterogeneous mixtures of the foregoing.

According to the invention, the alumina admixed or combined with the hydrous oxide of silica may be in either hydrated or non-hydrated form. For example, the alumina in hydrated forms may include alumina hydrogel, alumina hydrosol, or gelatinous precipitates of alumina. The non-hydrated alumina may comprise, for example, alumina gel, relatively pure bauxite and Activated Alumina. In case the alumina is in non-hydrous form, it should preferably have adsorptive properties indicating a capillary structure.

In lieu of employing an oxide of alumina, compounds of aluminum capable of being decomposed either by heat or by chemical reaction into the oxide, such as, for example, aluminum nitrate or aluminum chloride, may be employed.

The hydrous oxide of silicon which is combined with the alumina to form the desired catalyst may comprise, for example, the intermediate products formed during the production of silica gel prepared as described in the Patrick Patent 1,297,724. According to the general procedure there outlined, a solution of sodium silicate and an acid of complementary normalities are combined confluently during constant agitation of the mixture so that the resulting combined mixture is slightly acid and at relatively uniform acid concentration throughout the mixing. When conditions are properly controlled, as described in the patent, a relatively clear solution results which upon standing for a period of from 8–24 hours sets into a firm hydrogel. The hydrogel so formed is thereafter broken into lumps, washed free of acid ions and thereafter heated at a relatively low temperature to evaporate the water. During the final stages of the heating, the temperature is gradually raised up to 800° F. and maintained at such temperature for a period of from 3-4 hours to effect the final drying and activation of the silica gel.

The alumina in any of its various forms above described, may be combined with the clear hydrosol or with a hydrogel prior to or subsequent to the washing operation or with the partially dried hydrogel.

The hydrous oxide of silicon may also comprise the gelatinous precipitate of silica; such a gelatinous precipitate may be prepared for example, by acidifying sodium silicate either with an acid or with ammonium chloride or by hydrolyzing a silicon salt, such as silicon chloride or fluoride.

The hydrous oxide of silicon may also comprise heterogeneous mixtures of hydrosol, hydrogel and gelatinous precipitate of silica, for example, by varying the conditions at the time the sodium silicate is combined with the acid, a clear product may be obtained as described in the Patrick patent above, or an intermediate gelatinous precipitate of silica may be formed or heterogeneous mixture of silica in the form of a hydrosol and gelatinous precipitates may result.

Relative proportions of silica and alumina present in the final catalyst may be varied over a wide range, for example, the molar ratio of silica to alumina may range between 2:1 to 20:1 or more. Silica alumina catalysts having a molar ratio of silica and alumina of between 10 and 15:1 have proven most effective.

As a guide in carrying out the invention to obtain the greatest benefits therefrom, the following examples may be helpful, it being understood that the data given herein is illustrative rather than limitative.

In all of the tests hereinafter, the efficiency of the catalyst was determined by passing vapors of an East Texas gas oil having an A. P. I. gravity of 33.8 at a temperature of 850° F. over the catalyst at a rate of .6 volume of liquid oil per volume of catalyst per hour for a two hour period. The efficiency is expressed in the percentage of liquid distillate produced having an end boiling point of 400° F.

*Example 1*

An aluminum sulphate solution was combined with sodium silicate in the following manner. A sodium silicate solution of 12 Bé. gravity and having a molar ratio of $Na_2O$ to $SiO_2$ of 1 to 3.5 was first combined with NaOH with a proportion of 3.3 grams of NaOH per liter of sodium silicate solution. A second solution was prepared containing 113.5 grams of $Al_2(SO_4)_3.15H_2O$ and 35 grams of sulphuric acid per liter. The separate solutions were then combined by adding the two simultaneously to a separate mixing vessel while at room temperature, the relative proportions of the two solutions being such as to produce a final product having a mol ratio of $SiO_2$ to $Al_2O_3$ of about 10:1. During mixing, the solution was vigorously agitated to insure thorough homogeneity. The resulting product contained about .4N excess acidity. A clear solution resulted, which, at the end of 8 hours, set into a firm hydrogel containing both the silica and the alumina.

When the gel had been fully developed so that it began to crack, it was broken into small lumps varying from ½ to 1" in size. These lumps were immersed in an ammonium hydroxide solution containing 100 grams of concentrated ammonium hydroxide per liter of solution. After being allowed to stand at room temperature for a period of 12 hours, the hydrogel was drained and washed with water until the wash water was relatively free of sulfate ions.

The washed hydrogel was then drained and dried at a temperature below 212° F. until it assumed a dry appearance. It was then slowly heated to a temperature of about 800° F. and maintained at such temperature for a period of about 3 hours. The product was then formed into pills of about 1 mm. in diameter and 2 mm. in length, after which its efficiency as a cracking catalyst for hydrocarbon oils was tested.

The catalyst described above when tested under the specified conditions resulted in a conversion of 400 end point distillate amounting to 53%.

*Example 2*

Another catalyst was prepared according to the same general procedure outlined in Example 1 except that the relative proportions of the two solutions were varied to form a catalyst in which the molar ratio of silica and alumina was 7.5:1. This product resulted in a conversion amounting to 47%.

*Example 3*

Another catalyst prepared in the same manner except that the relative proportions of the two solutions were varied to produce a catalyst having a molar ratio of silica to alumina of 5:1 when tested under the same conditions gave 54% distillate.

*Example 4*

A silica hydrogel prepared in accordance with the method described in the Patrick Patent 1,297,724 except that the product was not subjected to drying treatment, was mixed with various proportions of alumina hydrogel in a ball mill so as to form separate batches of catalyst having molar ratios of silica to alumina of 10:1, 7.5:1, 5:1, and 2.5:1. These catalysts when tested under the conditions above outlined resulted in conversions of 52%, 47.5%, 44% and 42% respectively.

*Example 5*

A silica hydrogel as described in Example 4, was homogenized in a ball mill with dry alumina gel in such proportions that the resulting catalyst had a molar ratio of silica to alumina of 5:1. This product when tested under the same conditions as before described resulted in a conversion of 49.5%.

*Example 6*

A silica hydrogel prepared as described in Example 4, was impregnated with solutions of aluminum nitrate of such concentrations as to produce separate batches of catalyst having molar ratios of silica to alumina of 60:1, 30:1, 15:1, 12:1 and 8:1. The impregnated product was then drained and dried by heating to a temperature below 212° F. for a period of about 12 to 24 hours. The product was thereafter heated to a temperature of 800° F., and maintained at such temperature for a period of about three hours. This final heating step causes the aluminum nitrate to decompose to form the aluminum oxide.

The separate batches of catalyst in the order above set forth when tested under the conditions before described, resulted in conversions of 43%, 50.5%, 51.5%, 53.5% and 46% respectively.

*Example 7*

For comparative purposes, a series of catalysts were prepared by admixing dry silica and alumina gels having molar ratios of silica to alumina of 15:1, 10:1, 7.5:1, 5:1 and 2.5:1 in a ball mill. When tested under conditions heretofore described, these catalysts resulted in conversions of 12%, 16.2%, 15%, 15% and 16% respectively.

Example 8

Another series of catalysts were prepared in accordance with Example 5, except that instead of using silica hydrogel, dry silica gel prepared as described in the Patrick patent was impregnated with aluminum nitrate solutions. The concentrations of the aluminum nitrate solutions were varied to form separate batches of catalyst having weight ratios of silica to alumina of 1:5, 2:5, 5 and 7:5.1. These catalysts when tested gave conversions of 16%, 16.5%, 22 and 21.5% respectively.

Example 9

A gelatinous precipitate of silica was first prepared by combining equal portions of sulphuric acid of 23 Bé. at 60° F. with a sodium silicate solution of 25 Bé.; the mixture was vigorously stirred during the addition of the reactants and a gelatinous precipitate of silica formed immediately. This gelatinous precipitate was thoroughly washed of reaction salts and thereafter separated into a plurality of fractions. The separate fractions were treated with aluminum nitrate solution of 20, 30, 40, 50 and 60% respectively. The impregnated product was thereafter dried and heated to decompose the nitrate into the aluminum oxide. As a result, a series of catalysts were formed having varying concentrations of alumina therein. These catalysts when tested under the conditions heretofore outlined, resulted in conversions of 54.0, 53.0, 56.0, 49.0 and 49.5% respectively. From the above, it will be apparent that the gelatinous precipitate of silica impregnated with a 40% solution of aluminum nitrate proved most effective.

Example 10

Separate fractions of gelatinous precipitate of silica prepared as described in Example 9 were homogenized in a ball mill with different proportions of dry alumina gel to form resulting catalysts having molar ratios of silica to alumina of 5:1, 10:1, 15:1, 20:1 and 30:1. These catalysts when tested under the conditions heretofore described resulted in conversions of 51.5, 53.0, 53.0, 47.0 and 47.5% respectively.

Example 11

A series of catalysts were prepared similar to those described in Example 10 except that hydrous alumina gel in the form of gelatinous alumina was employed in lieu of the dried alumina gel. These products having molar ratios of 5:1, 10:1, 15:1, 20:1 and 30:1 resulted in conversions of 53.0, 55.0, 54.5, 53.0 and 52.5% respectively.

Example 12

A sodium silicate solution was hydrolyzed with an acid under carefully controlled conditions described in the Patrick Patent 1,297,724 to form a clear hydrosol of silica, which if permitted to stand would set into a silica hydrogel. Hydrous alumina gel was added to the separate fractions of the silica hydrosol prior to the setting into the hydrogel to form a final product having a molar ratio of silica to alumina of 5:1, 10:1 and 15:1. The resulting mixture was then allowed to set into a hydrogel and the hydrogel was then broken up and washed free of reaction salts. The products were then dried and heated to form dry gels having varying proportions of silica to alumina as described. These products when tested under the conditions described resulted in conversions of 40.5, 48.5 and 51.5% respectively.

Example 13

A second series of catalysts were prepared similar to those set forth in Example 12 except that dry alumina gel was admixed with the silica hydrosol. The resulting products having molar ratios of 5:1, 10:1 and 15:1 were tested under conditions previously described, resulting in conversions of 49.0, 48.0 and 57.0%.

The above examples serve to illustrate that the alumina when combined with the hydrous oxide of silicon produces catalysts of materially higher efficiency than is produced when combining the alumina with the non-hydrous oxide of silicon.

Having described the preferred embodiment of this invention and given specific examples thereof, it will be understood that it involves such other variations and modifications as come within the spirit and scope thereof.

I claim:

A process for the cracking of hydrocarbon oil comprising passing said oil at cracking temperature in contact with a catalyst comprising essentially silica and alumina but substantially free of alkali metals formed by combining an aluminum compound of the class consisting of an oxide having a capillary structure and a compound convertible into the oxide with a mixture of silica hydrosol and a gelatinous precipitate of silica, thereafter converting the silica hydrosol into silica hydrogel, washing said hydrogel free of undesirable impurities and drying the resulting product, and maintaining said oil in contact with said catalyst for a period sufficient to effect the desired cracking.

GERALD C. CONNOLLY.